United States Patent Office 3,473,385
Patented Oct. 21, 1969

3,473,385
THERMOMETER FOR MEASURING VERY LOW TEMPERATURES
Kiichi Komatsubara, Kodaira-shi, Japan, assignor to Hitachi, Ltd., Tokyo, Japan, a corporation of Japan
Filed May 9, 1967, Ser. No. 637,113
Claims priority, application Japan, June 20, 1966, 41/57,675
Int. Cl. G01k 5/48
U.S. Cl. 73—362    3 Claims

ABSTRACT OF THE DISCLOSURE

A resistance thermometer which measures very low temperatures of from 0.5° K. to 10° K. as a variation in the resistivity of a sensor which is composed of a single crystal of n-type indium antimonide having an impurity concentration of from $1 \times 10^{14}$ atoms/cc. to $5 \times 10^{14}$ atoms/cc. The sensor may be embedded in a body of sapphire for mechanical protection.

BACKGROUND OF THE INVENTION

Field of the invention

The present invention relates to a thermometer for measuring temperatures at a very low temperature range employing an indium antimonide (InSb) element.

Description of the prior art

Heretofore, a measurement of very low temperatures has been carried out by utilizing variations in carbon resistance, germanium resistance, platinum resistance, or the like, or magnetic susceptibility with temperature. For a measurement of an extremely low temperature, for example $\frac{1}{100}$° K. or lower, the variation in the magnetic susceptibility of rochelle salt or the like with temperature has often been utilized. For a precise measurement of a very low temperature a method in which variation in the resistance of platinum is measured by means of a high sensitivity potentiometer has been employed. However, these conventional methods have the following disadvantages.

SUMMARY OF THE INVENTION

A carbon resistance thermometer is poor in its linearity of characteristics at about 1° K., is difficult to calibrate, and its characteristics change with time. A germanium resistance thermometer shows good linearity at about 10° K., but poor linearity at lower temperatures and its sensitivity is also poor. The method in which the magnetic susceptibility of rochelle salt is employed or the resistance of platinum is measured by means of a high sensitivity potentiometer is troublesome to carry out.

An object of the present invention is to provide a novel temperature measuring device which can precisely measure a very low temperature, in particular a temperature within the range of from 0.5° K. to 10° K.

Another object of the present invention is to provide a semiconductor device of which variation in the resistance with temperature is large at very low temperatures ranging from 0.5° K. to 10° K.

A further object of the present invention is to provide a novel device capable of measuring magnetic field strength at a very low temperature, within the range of from 0.5° K. to 10° K.

The present invention is based on the experimentally found fact that variation in the resistance with temperature of an n-conductivity type indium antimonide single crystal with an impurity concentration of from $1 \times 10^{14}$ atoms/cc. to $5 \times 10^{14}$ atoms/cc. is very large at temperatures ranging from 0.5° K. to 10° K. and, moreover, the temperature versus resistance characteristics thereof are linear in logarithmic scale. According to the present invention, the above-mentioned objects are attained by employing such an indium antimonide single crystal body as a thermometer element in a temperature measuring device.

In the present invention, the thermometer is formed by cutting an n-type indium antimonide single crystal with an impurity concentration of from $1 \times 10^{14}$ atoms/cc. to $5 \times 10^{14}$ atoms/cc. into a rod of appropriate dimension, for example a rod of 5 mm. in length and 1 mm.² in cross-section, to each end of which a current terminal and a voltage terminal are attached, and an appropriate mechanical protection may be provided to the thermometer. There are various methods of measuring a very low temperature, among which the simplest and most sensitive one is to know the temperature indirectly by measuring a voltage generated across the voltage terminals when a definite micro-current is allowed to flow through the thermometer immersed in the region the temperature of which is to be measured. The ambient temperature can be known by measuring the voltage generated across the voltage terminals because the bulk resistance of the thermometer varies depending on the ambient temperature, resulting in corresponding variation in the generated voltage.

The experimentally determined relation between the ambient temperature T and the bulk resistance δ of the thermometer within the temperature range of from 0.5° K. to 10° K. was (1)    $\delta = A - D \log T$ where A and D were constants which were determined by the characteristics of the device. The constants A and D can be determined by precisely measuring the temperature and the bulk resistivity at two temperatures near 4.2° K. The measurement of temperature within the range of from 0.5° K. to 10° K. can be made with an accuracy of three digits.

The constant A varies when a magnetic induction B exists, the variation being represented by (2)    $A = A'\left(1 + \log \dfrac{C}{B^2}\right)$ where A' and C are constants determined by the characteristics of the thermometer, the magnitude thereof being, for example, of the order of $5 \times 10^{-4}$/gauss·degree for a thermometer element with an impurity concentration of $2 \times 10^{14}$ atoms/cc. This constant C is determined by calibration of each thermometer. From the above Equation 2, the magnitude of the magnetic field can be known when the variation in resistance is known, or alternatively when the magnitude of the magnetic field is known, the ambient temperature can be known.

At a temperature of from about 0.5° K. to about 1° K. not only the characteristics of conventional carbon resistance thermometer and germanium resistance thermometer become non-linear, but also the sensitivity thereof is degraded as well as there arises a secular change. In contrast to this, a thermometer of the invention is linear in logarithmic scale in its characteristic, as has already been stated, is an order of magnitude of one or more higher than the conventional one in sensitivity, does not undergo a secular change, and is easily calibrated. For example, even if the calibration is made only within a narrow range near 4.2° K., an exact measurement is assured over the range of from 0.5° K. to 10° K. Also, even when a magnetic field exists, provided that the magnitude thereof is known, the measurement of temperature can be made exactly, and the handling of the thermometer of the invention under a magnetic field is very simple as compared with the conventional one which varies in its characteristic under a magnetic field or which utilizes the variation in magnetic susceptibility. Moreover, the thermometer of the invention can be utilized as a magnetometer at a known ambient temperature, at which time the magnitude of a magnetic field of from 100 to 3000 gausses can be exactly measured.

Although, in the present invention, a body of n-type indium antimonide having an impurity concentration of from $1 \times 10^{14}$ to $5 \times 10^{14}$ atoms/cc. is employed as a thermometer element, when such a high accuracy as intended in the present invention is not required, a thermometer element having an impurity concentration outside the above range can be employed.

Since the resistance of a thermometer element employed in the present invention ranges from several ohms to several hundred ohms at very low temperatures, if a current flowing through the element is large, the element itself generates heat, resulting in an error in temperature measurement. Therefore, the current, to flow through the thermometer element, must be a micro current of the order of from $10 \mu a.$ to 1 ma.

BRIEF DESCRIPTION OF THE DRAWINGS

An embodiment of the present invention will now be described with reference to the attached drawings, in which.

DESCRIPTION OF THE PREFERRED EMBODIMENT

Figure 1:
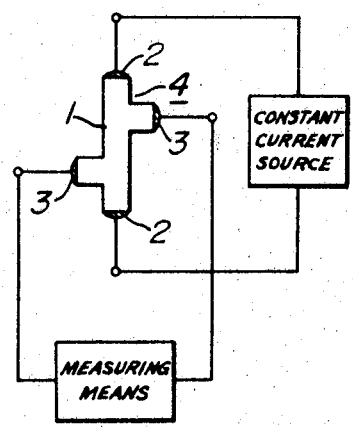
FIG. 1 is an enlarged elevational view of a thermometer device according to the present invention.

Now, referring to FIG. 1, a body of n-type indium antimonide single crystal 1 has an impurity concentration of from about $1 \times 10^{14}$ to about $5 \times 10^{14}$ atoms/cc.

This indium antimonide single crystal was made by the known zone leveling method. An n-type impurity for indium antimonide can be selected from lithium, tin, selenium, and tellurium as the case may be.

A plate of indium antimonide 1 mm. thick is cut from a portion, having a predetermined resistivity, of a body of indium antimonide single crystal made by the zone leveling method and then an element of the configuration shown in FIG. 1 is obtained by working the indium antimonide plate with an ultrasonic cutter or the like. The main body of the element of FIG. 1 is 1 mm. x 1 mm. in cross-section and 5 mm. in length and is provided transversely thereto with two opposite terminals 3 at positions 1 mm. from the respective ends 2 thereof. To four terminal portions 2 (current terminals) and 3 (voltage terminals) of the element 1 are soldered lead wires.

Figure 2:
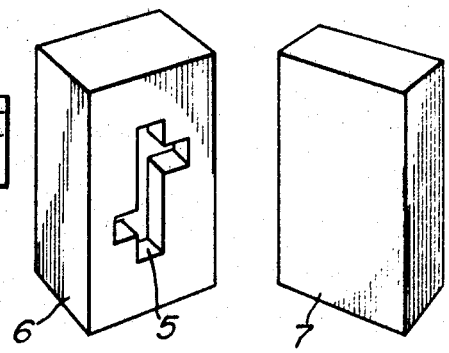
FIG. 2 is a perspective view of a capsule for the thermometer device of FIG. 1.

The resulting device 4 is embedded in and bonded to a recess 5 having a geometry fitting the device 4 formed on a sapphire plate 6 having a dimension 9 mm. x 5 mm. x 3 mm. as shown in FIG. 2 and then another sapphire plate 7 is bonded to the plate 6. By embedding the thermometer device 4 in sapphire, good heat conduction and mechanical protection are assured.

Figure 3:
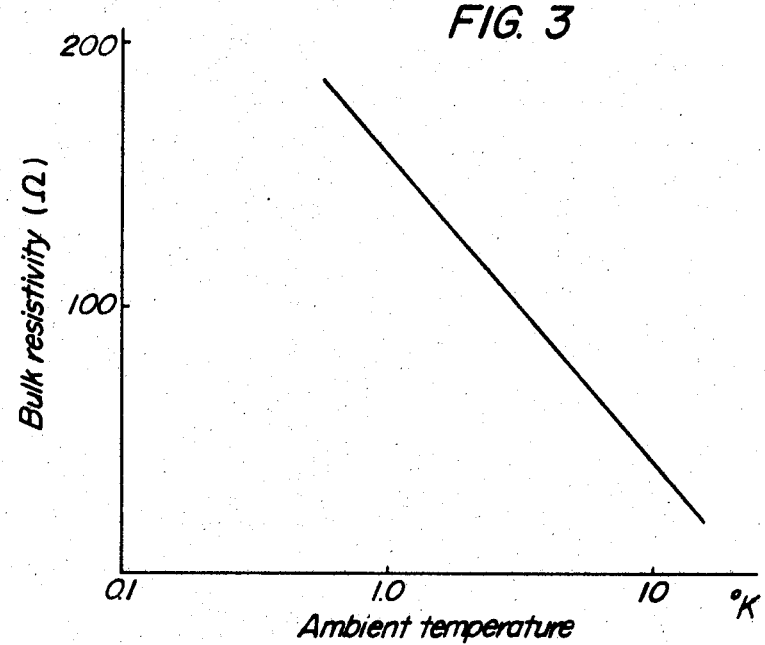
FIG. 3 is a graph showing the temperature versus resistance characteristic of a thermometer device according to the present invention.

FIG. 3 shows the variation in the bulk resistivity of a thermometer device constructed as shown in FIG. 2 with the temperature ranging from 0.5° K. to 10° K. under no external magnetic field. The device used in this measurement is constituted by n-type indium antimonide having an impurity concentration of $2 \times 10^{14}$ atoms/cc. As evident from FIG. 3, the characteristic is linear in logarithmic scale.

I claim:
1. An apparatus for measuring very low temperatures comprising a single crystal body of n-type indium antimonide having an impurity concentration of from $1 \times 10^{14}$ atoms/cc. to $5 \times 10^{14}$ atoms/cc. and having the relation

$$\delta = A - B \log T$$

between the bulk resistivity thereof and temperature within the range of from 0.5° K. to 10° K. where A and B are constants, and means connected to said body of indium antimonide single crystal for measuring the bulk resistance of said body.

2. The apparatus for measuring very low temperatures according to claim 1, in which said means for measuring the bulk resistance comprises a constant-current source for feeding a constant current of from 10 $\mu a.$ to 1 ma. to said body of indium antimonide single crystal, and voltage measuring means for measuring a voltage drop across said body of indium antimonide single crystal due to said constant current flowing through said body.

3. The apparatus for measuring very low temperatures according to claim 1, further comprising a body of sapphire, said crystal body being embedded in said body of sapphire for mechanically protecting said single crystal body of indium antimonide.

References Cited

UNITED STATES PATENTS

| 2,778,802 | 1/1957 | Willardson et al. |
| 2,942,177 | 6/1960 | Neumann et al. ____ 324—46 XR |
| 3,011,133 | 11/1961 | Koenig et al. |
| 3,109,985 | 11/1963 | Kallman _____ 338—32 |

LOUIS R. PRINCE, Primary Examiner

FREDERICK SHOON, Assistant Examiner

U.S. Cl. X.R.

307—310; 324—46; 338—22